Feb. 14, 1933.    F. P. CONNORS    1,897,720
ADJUSTABLE BELT PULLEY
Filed July 1, 1929    6 Sheets-Sheet 2

INVENTOR.
Frederick P. Connors
BY
Myron J. Dikeman
ATTORNEY.

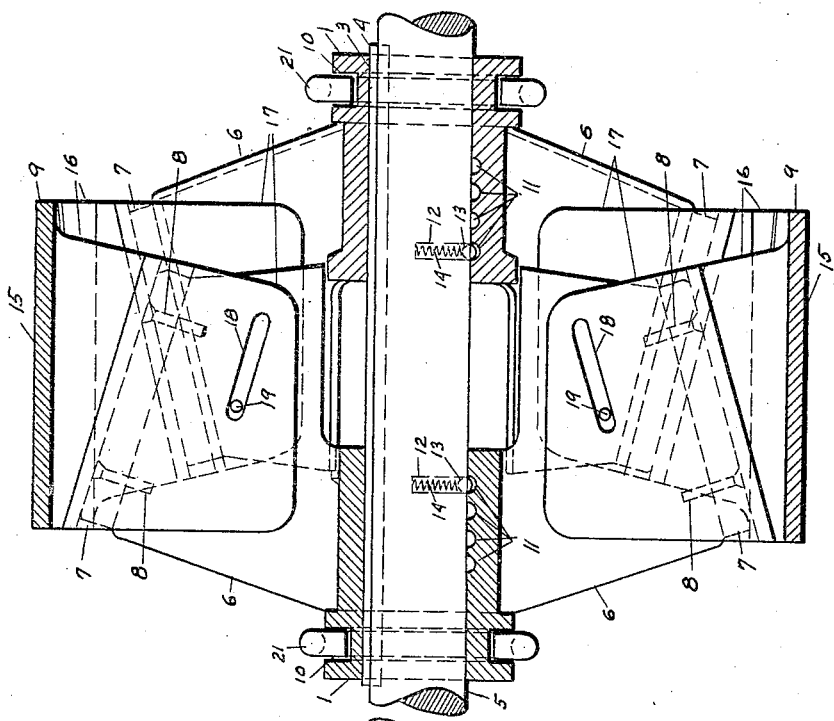
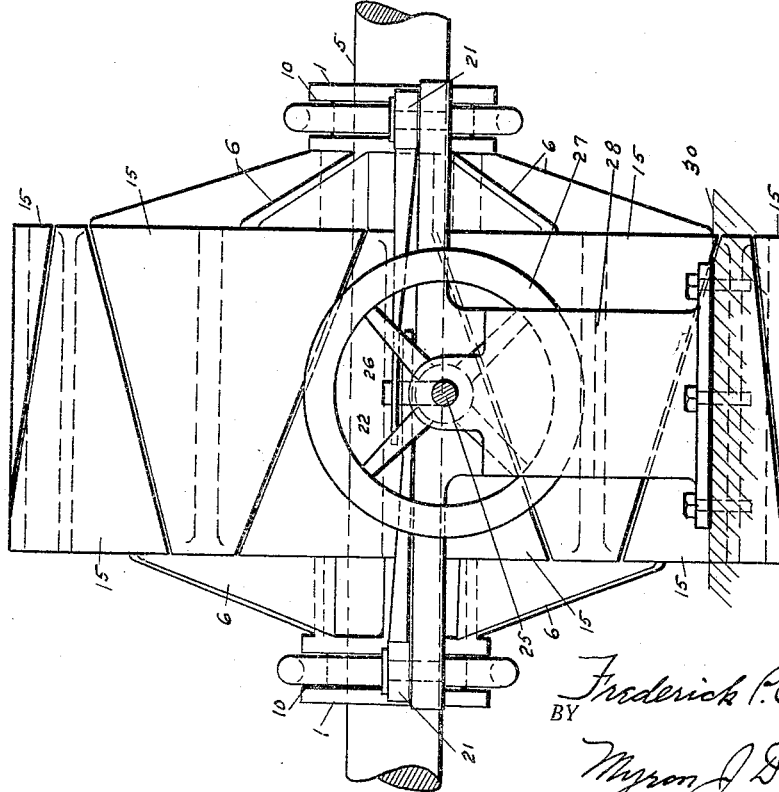
Fig. 4
Fig. 3
INVENTOR.
Frederick P. Connors
BY
Myron J. Dikeman
ATTORNEY.

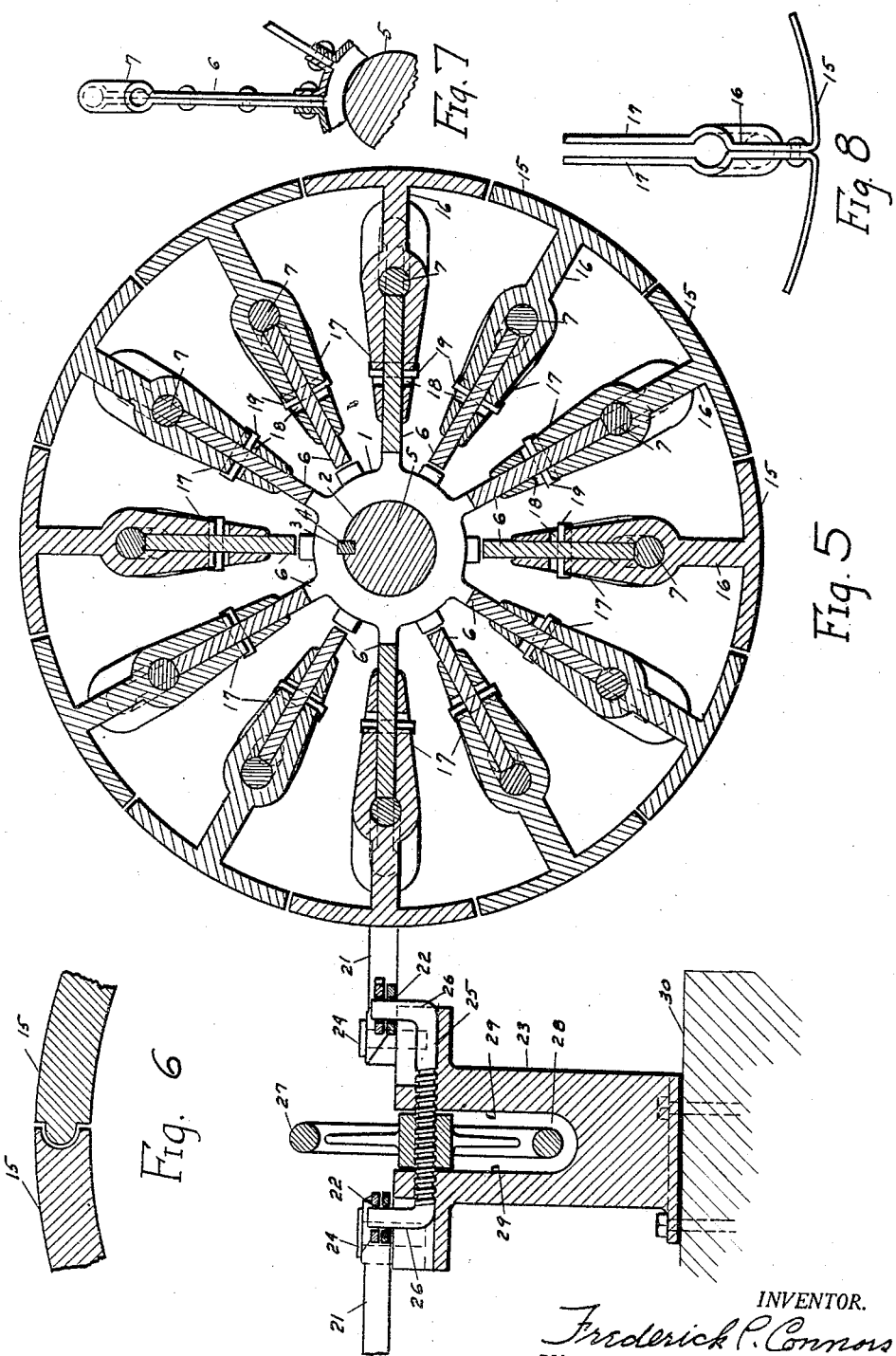

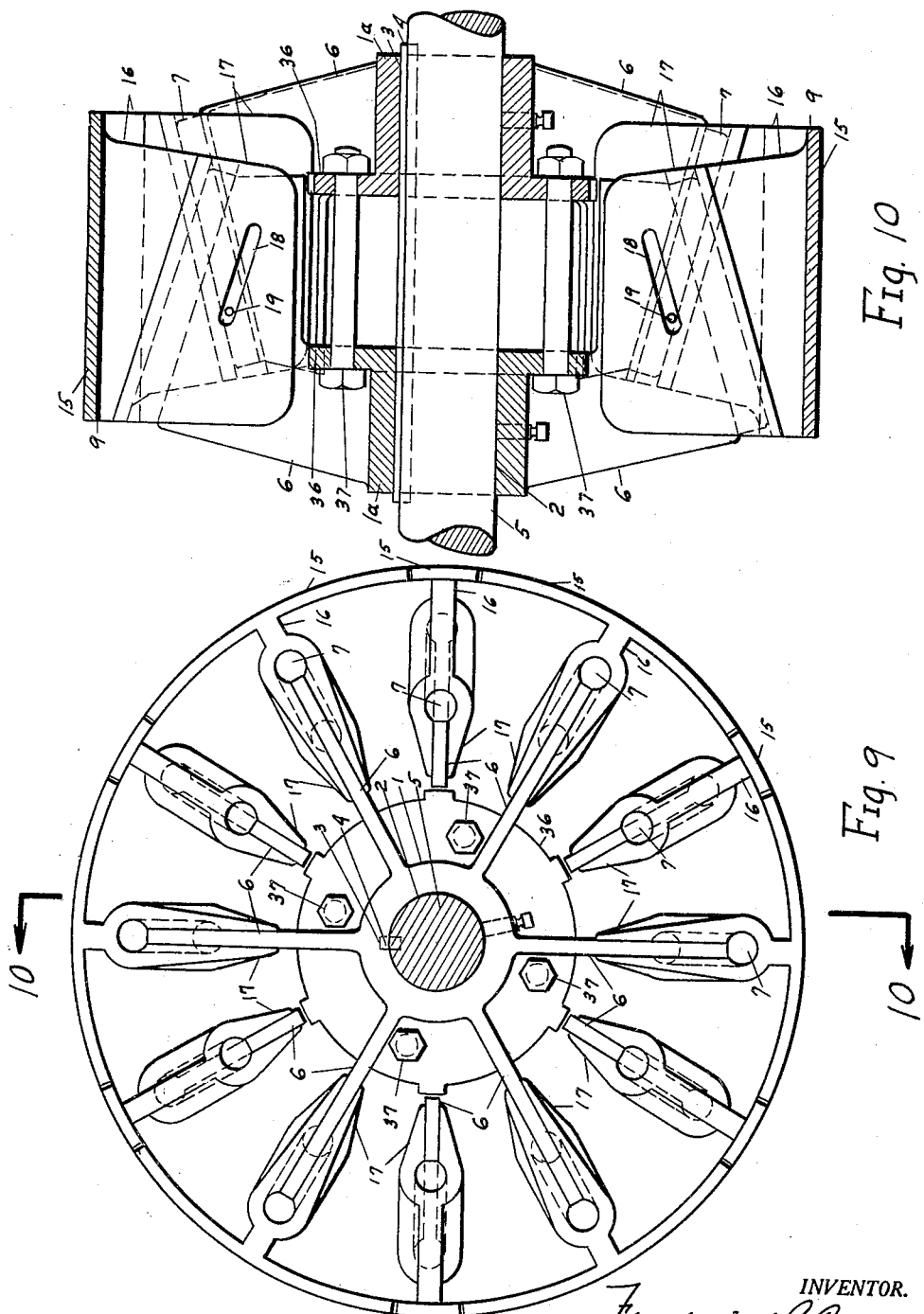

Feb. 14, 1933.                F. P. CONNORS                1,897,720
                            ADJUSTABLE BELT PULLEY
                             Filed July 1, 1929         6 Sheets-Sheet 6

INVENTOR.
Frederick P. Connors
BY Myron J. Dikeman
ATTORNEY.

Patented Feb. 14, 1933

1,897,720

UNITED STATES PATENT OFFICE

FREDERICK P. CONNORS, OF DETROIT, MICHIGAN

ADJUSTABLE BELT PULLEY

Application filed July 1, 1929. Serial No. 375,092.

The object of my invention is to provide an adjustable belt pulley capable of being changed to different pulley diameters.

Another object is to produce an adjustable belt pulley so designed that the belt rim diameter may be varied and changed while the pulley is being operated at full speed.

A further object is to provide an adjustable pulley that is adapted for use in pairs connected by an operating belt, that can be so operated that the velocity of one pulley may be changed without changing the velocity of the other pulley.

A still further object is to provide an adjustable belt pulley that will provide means for taking up the slack in driving belts used thereon.

Another object is to provide a design for an adjustable belt pulley, adapted for manufacturing by press and die machinery from sheet metal, that will operate efficiently and easily and can be manufactured at a very low cost. These several objects are attained in the preferred form by the construction and arrangement of parts more fully hereinafter set forth.

Similar parts on all drawings are marked by similar numerals.

Fig. 3 is an end view taken on the line 3—3 of the Fig. 1 showing the relative position of the operating, and clutch mechanism.

Fig. 4 is a sectional view through the pulley taken on the line 4—4 of the Fig. 1 showing the general construction and arrangement of the operating members.

Fig. 5 is a sectional view taken on the line 5—5 of the Fig. 2 showing the adjusting means for the pulley rim segments, and means for retaining the sections together.

Fig. 6 is a sectional view taken on the line 6—6 of the Fig. 2 showing a means for splining the perimeter segments together.

Fig. 7 is a detail of an alternate design of the hub spoke and slide especially adapted for sheet metal construction.

Fig. 8 also is a detail of an alternate design of the rim segment and slide, especially adapted for manufacturing from sheet metal by press and die machinery.

Fig. 9 is a side view of a modified form of pulley where the automatic clutch and operating mechanism is omitted and the pulley adjustment made by connecting bolts instead.

Fig. 10 is a vertical section of the modified form of pulley shown in Fig. 9, taken on the line 10—10 of Fig. 9 showing the interior arrangement of the operating parts and bolt means for adjusting the sections.

Figure 11:
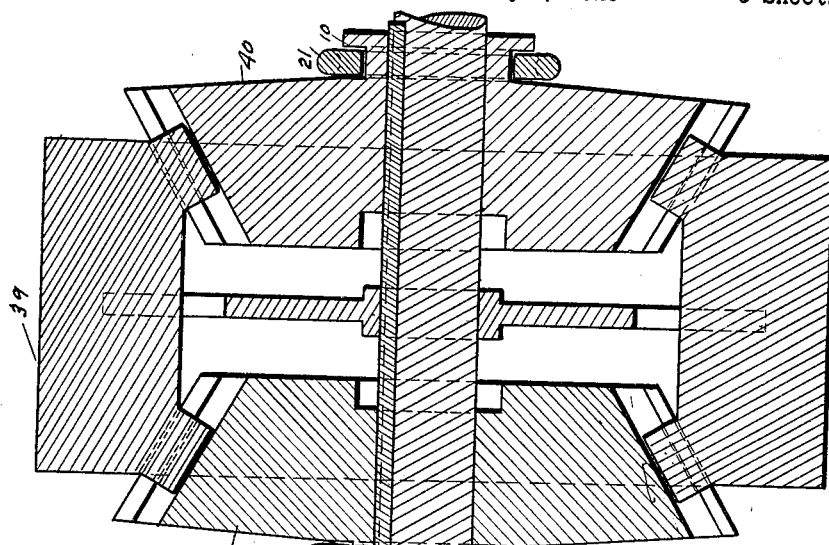

Fig. 11 shows a vertical section through an alternate form of pulley illustrating the application of the double cone adjusters where both cones are connected to each rim segment, instead of the separate cones being connected to alternate segments only.

Figure 12:
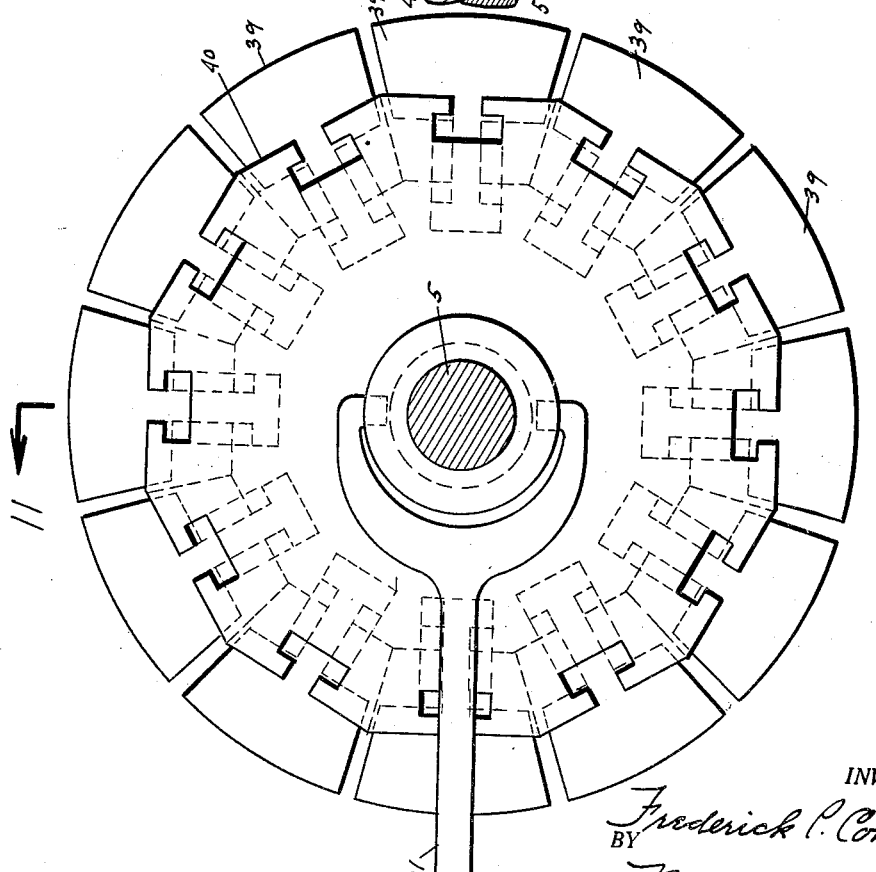

Fig. 12 shows an elevation of the structure shown in Figure 11.

I will now describe more fully the detailed construction of my device referring to the drawings and the marks thereon.

In many types of machinery variable speeds are required for different classes of work performed thereon, such as the ordinary turning lathe, drill presses, grinding machines &c., the change of speed usually being accomplished by a series of stepped belt pulleys of different diameters, and shifting the driving belt from one pulley to another. My device accomplishes the same result when used in pairs of proper dimensions, without shifting the drive belt or stopping the machine, simply by changing the ratio of pulley diameters by the connected automatic adjusting mechanism, and while I have shown and described only a single pulley with its operating mechanism, it is to be understood that these pulleys are to be used in pairs connected by a drive belt, and also connected by a common shifting mechanism adapted for decreasing the diameter of one pulley as the other pulley diameter is increased, and in a ratio that will always keep the connecting belt tight and at the same belt tension.

In general my device comprises a double coned hub suitable for mounting on a pulley shaft and splined thereto, each hub being formed with a series of radially positioned web spokes extending lengthwise of the hubs. The exterior edges of the web spokes being formed to the lines of a cone frustrum on each hub and slide means mounted or formed thereon, the webbed hub cones being mounted on the splined shaft in opposite directions, preferably the cones pointing toward each other. Rim segments are slidably mounted on the angularly formed web spoke edges, designed to change the pulley diameter for the various positions along the spokes. An adjusting clutch is mounted at each end of the pulley and connected to alternate rim segments in a manner to adjust same to their various positions as the pulley diameter change is made.

Figure 1:
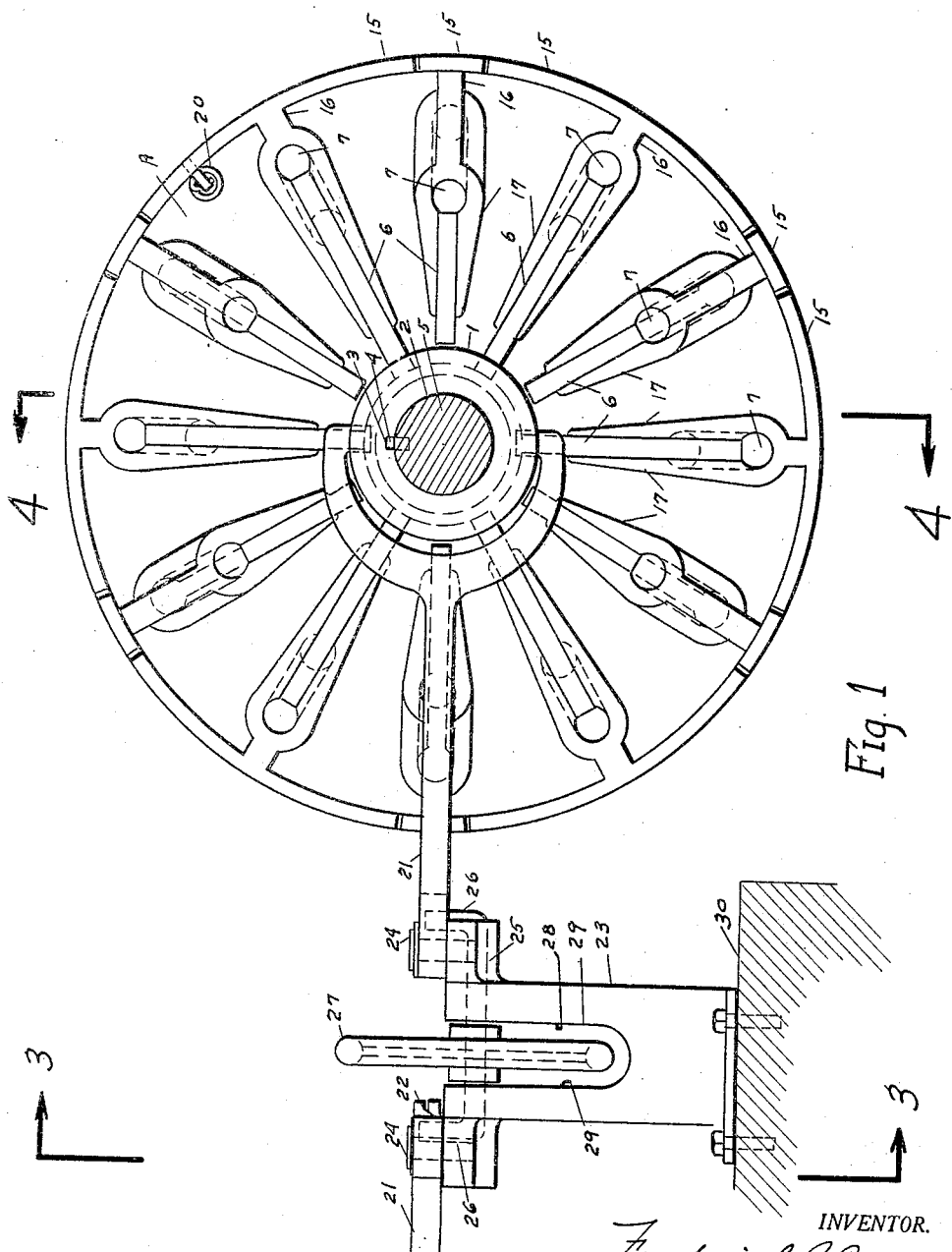
Fig. 1 is a side view of my assembled pulley showing the general exterior arrangement with the operating clutch attached.
Figure 2:
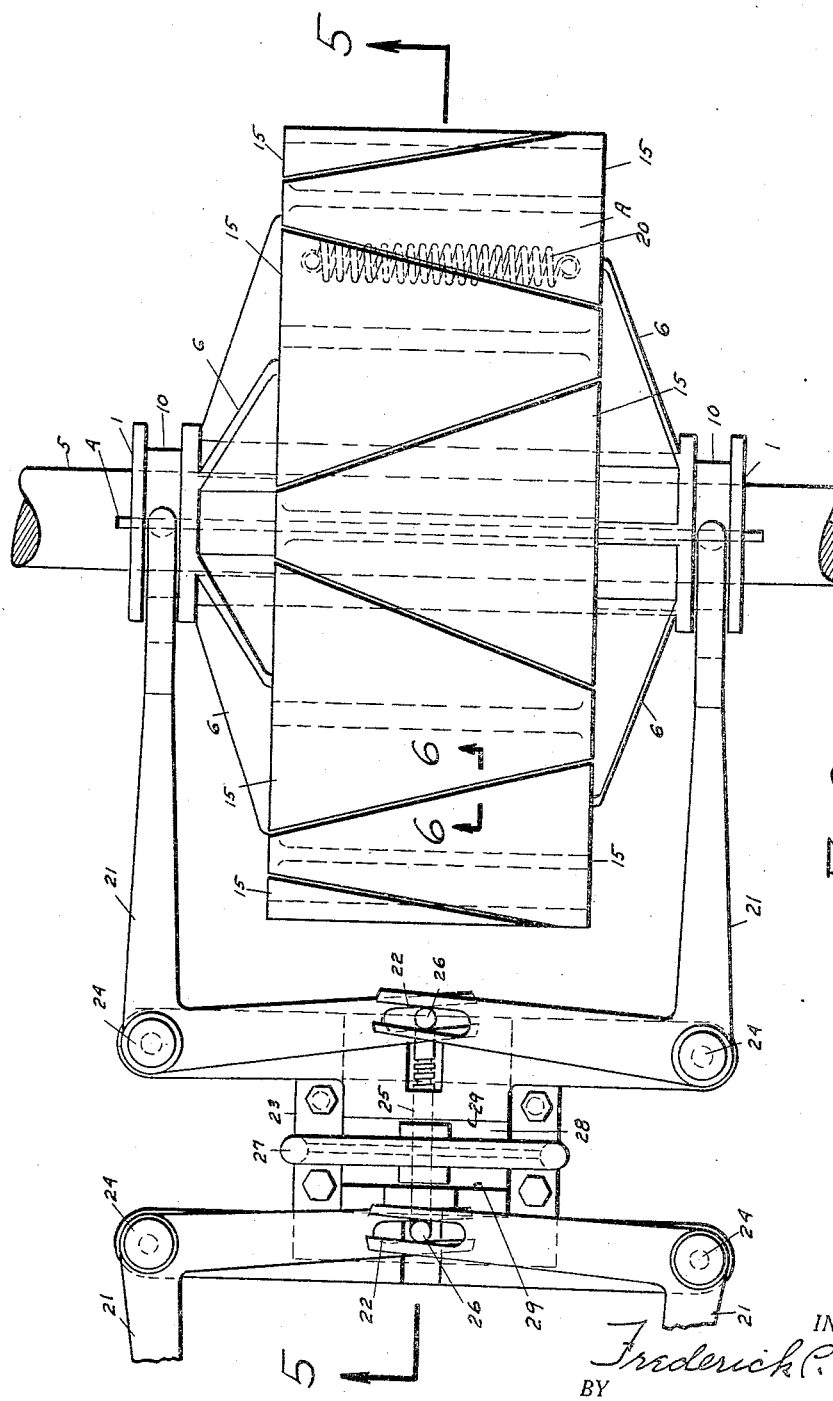
Fig. 2 is a top view of the assembled pulley showing the interwoven perimeter segments and double clutch operating mechanism.

The two hub sections —1— are cylindrical in form, and preferably made of cast metal and formed with a true shaft bearing —2— positioned along the hub axis, the bearing being provided with a suitable key way —3— and key —4— for splining the hubs —1— to an operating shaft —5—. The hubs —1— are formed with radially positioned web spokes —6— arranged lengthwise of the hub sections, the outer edges of said web spokes being formed to the lines of a cone frustrum, and at some predetermined angle with the hub axis. Along the sloping edges of the web spokes —6— are formed slide members —7—, preferably a cylindrical rod securely attached to the web spoke edges by means of suitable bolts —8—, both the web spokes and slides being projected beyond the inside end of the hubs. Any other type of slide may be employed if desired that would be suitable for slidably mounting the pulley rim sections thereon. The outer ends of the hub sections —1— are formed with suitable clutch grooves —10— extending around the hub circumference and concentric with the hub axis. The two hub sections —1— are mounted on the pulley shaft —5—, positioned thereon with the cone shaped web sloping toward each other, and with their respective web spokes —6— over-lapping and interweaving with each other, all spokes being positioned uniformly equal-distance apart around the shaft —5—, and splined to the said shaft —5— in that position by the key —4— in the ordinary manner, each hub section being free to slide thereon. Inside the bearings —2— are formed a series of notched recesses —11—, being small cavities formed either within the bearing wall or formed as annular recesses extending around the bearing. The recesses —11— are placed therein at various pre-determined positions within the hub bearings, at desired intervals for locking the hub sections to the shaft —5—. Within the shaft —5— are formed two ball recesses —12—, each positioned opposite one of the inner hub locking recesses, and are provided with locking balls —13— and pressure springs —14—. The purpose of the spring —14— being to force the balls —13— outward and into the locking recesses —11— for rigidly holding the hub sections at various positions on the shaft without applying external pressure thereto, and to relieve the pressure and wear upon the operating clutch mechanism engaging the clutch grooves —10—. Any other type of hub locking means may be adapted if desired. Slidably mounted on the web spoke slides —7— are the rim segments —9—, formed with a V-shaped curved perimeter segment —15—, each being provided with a web spoke —16— radially positioned therein and formed with a slide groove suitable for receiving the web spoke slide —7— therein, and always retain the perimeter segment —15— in positions parallel to the shaft —5—. Alternate rim segments —9— are mounted on the web spoke slides pointing in opposite directions along the shaft axis, overlapping and interweaving with each other as indicated in Figs. 2 and 3 of the drawings, forming a full cylindrical perimeter for the pulley. The angles at which the perimeter segments —15— are formed must be predetermined in each case, and are governed and controlled by the angle of approach formed along the cone shaped web spoke edges, the perimeter angles always being sufficient to increase the pulley perimeter as the web spoke slides —7— increase the pulley diameter. The ratio of these angles may vary with different sizes of pulley diameters. If desired, the perimeter segments may be formed with edge grooves and joints as indicated in Fig. 6 of the drawings, for more securely holding the rim segments together and forming a smoother pulley surface. Also the perimeter segment curved surfaces may be either cylindrical or conical as desired. The rim segments —9— are provided with side wings —17—, positioned to overlap and engage the sides of the web spokes —6— and slide thereon providing rigidity for the pulley rim segments. The side wings —17— are provided with adjusting slots —18— positioned parallel to the adjacent slides —7— and web spoke groove —16—, and is provided with a stop pin —19— passing therethrough and fixedly mounted through a hole in the web spokes —6—, at right angles thereto, providing means for preventing the rim segments separating from the supporting slides. If desired, to assist the sliding of the rim segments on the supporting slides in opposite directions and for holding the perimeter segment edged tightly together at all times, segment coil springs —20— may be attached to adjacent edges of the alternately placed rim segments, as illustrated in one of the sections marked —A— in Figs. 1 and 2, and stressed to force the perimeter segments together regardless of their sliding or expanding positions. The springs —20— are not shown in all of the segments, but are merely illustrated in one section only, and may be omitted if desired. Within the clutch grooves —10— are mounted forked clutch operating levers —21—, providing means for changing positions of the cone hubs, for increasing or decreasing the pulley diameter. As the cone hubs are forced together by the clutch operating levers —21—, the alternately attached rim segments are forced outward along the inclined web spoke slides —7—, their movements with the hubs being resisted by the opposing alternate segments connected to the opposite hub, the segments being moved both radially and laterally within the pulley, provide a full perimeter by the wedge movement of the segments, corresponding to the diameter for different positions on the web spoke slides. The forked operating levers —21— are formed L-shape with their opposite ends —22— slotted and over-lapping each other along the pulley center line, and are mounted on a rigid operating bearing frame —23— by the pivot pins —24—, and in a manner for moving the connected hub sections —1— uniformly and in unison in both directions along the splined pulley shaft —5—. Mounted within the operating bearing —23— is a threaded operating shaft —25— formed with hooked ends —26— and positioned within the bearing at right angles to the pulley shaft —5—, slidably mounted within said bearing, with one of the hooked ends —26— engaging the overlapping slotted ends —22— of the clutch operating levers —21—. An operating wheel —27— having a threaded hub center is mounted on the threaded operating shaft —25—, positioned within the bearing recess —28—, and retained therein in a permanent lateral position by the bearing side walls —29—. By rotating the operating wheel —27— the threaded shaft is drawn therethrough and likewise moving the connected clutch operating levers 21 accordingly, changing the positions of the pulley rim segments for either increasing or decreasing the pulley diameter. The bearing —23— is rigidly mounted on some suitable permanent support —30— and retained thereon in a fixed position with the pulley. By mounting a like pulley and operating mechanism as shown in the drawings on the opposite side of the operating bearing —23—, connecting the slotted ends —22— of the clutch operating levers to the opposite hook end —26— of the threaded shaft —25— and in like manner, the pulleys may be then employed in pairs, connected by a common belt section, and any adjustment of the operating wheel —27— will adjust both of the pulleys in unison, decreasing the diameter of one pulley as the pulley diameter of the opposite pulley is increased, and if the pair of pulleys are properly designed with respect to the ratio of both spoke and rim segment angles and the clutch operating levers, the increase or decrease of the pulley diameters will be accomplished in an inverse ratio, always keeping the sum of the two pulley circumferences at a constant length, or with the required variations to preserve a constant belt tension thereon.

Figs. 9 and 10 show a modified form of my adjustable pulley, of similar design as that shown and described heretofore, except the clutch grooves —10— and clutch operating mechanism is omitted, the hubs —1a— being formed with internal hub collars —36— which are connected together by suitable adjusting bolts —37—, providing means for changing the positions of the hub cones on the splined shaft —5—. The rest of the pulley is the same as heretofore described. The automatic adjusting mechanism being omitted its usefulness is limited and requires stopping of the pulley before adjustment can be made. The pulley is especially adapted as a belt tightener.

Figs. 11 and 12 illustrate an alternate form of my device, slidably connecting all of the rim segments —39— to both of the cone hub sections —40—, the cones acting in unison for forcing the rim segments outward, the hub cones being operated in the same manner as heretofore described. The result is practically the same as with the former described pulleys, except the perimeter sections separate slightly as the pulley is expanded.

While I have shown and illustrated my adjustable pulley as of a cast metal construction, it is to be understood that it may be also made of pressed sheet metal as illustrated in Figs. 7 and 8, and that the pulley is subject to various modifications in design without departing from the spirit of the invention, and that different types of slide means for mounting the rim segments to the hubs, as well as different clutch or locking means may be employed therewith, and I claim as my invention the pulley as shown or any modification thereof that is substantially a substitution of parts and means therein shown.

Having fully described my adjustable belt pulley what I claim as my invention and desire to secure by Letters Patent is:

1. An adjustable pulley adapted for changing the pulley diameter and used in combination with a pulley shaft, comprising a double hub frame formed of two tapered hub sections having suitable central bearings for mounting on a pulley shaft and splined thereto, each of said tapered hub sections being formed with a series of radially positioned hub ribs uniformly spaced along the tapered wall elements, pulley rim segments slidably mounted along the edges of said hub ribs, movable thereon in a direction parallel to the rib edge only, the rim segments on each of the hub sections being positioned to alternately overlap and interweave with the rim segments on the opposite hub sections, clutch means suitably mounted for engaging the two hub sections in a manner for displacing said hubs along the supporting pulley shaft in opposite directions, said alternately interwoven rim segments engaging each other in a manner for causing a sliding displacement thereof along the hub rib slides in opposite directions as said hub sections are being displaced causing a change of the pulley diameter.

2. An adjustable pulley adapted for changing the pulley diameter and used in combination with a pulley shaft, comprising two hub sections having suitable bearings for mounting same on a pulley shaft and splined thereto, each hub section being formed with a series of uniformly spaced radially positioned ribbed projections arranged lengthwise of the hubs and projected beyond the inner ends thereof, said rib projections having their outer edges sloping at an angle with the hub axis and toward the opposite hub forming a cone frustrum frame section, slide means formed along the sloping edges of each of the hub ribs, said hubs being positioned on the pulley shaft to alternately overlap and interweave said sloping hub ribs and slides together and so that alternate hub ribs slope in opposite directions, a pulley rim segment mounted on each of the rib slides and slidable thereon, said rim segments also positioned to alternately overlap and interweave with each other and engage alternate segments along their perimeter edges, clutch means suitably mounted for engaging each of the hub sections in a manner for displacing same along the supporting pulley shaft in opposite directions, thereby displacing the rim segments along the hub rib slides accordingly and changing the pulley diameter.

3. An adjustable pulley adapted for changing the pulley diameter and used in combination with a pulley shaft, comprising two cylindrical hub sections formed with a central bearing suitable for mounting same on a pulley shaft and splined thereto, each hub being formed with an outer end clutch groove and also with a series of uniformly spaced radially positioned web spokes arranged lengthwise of the cylindrical hubs, all of said web spokes having their outer edges sloping at an angle with the hub axis and toward the opposite hub and provided with slide means along the edges thereof, all web spokes and slides being projected beyond the inner hub ends, clutch means suitably mounted for engaging each of the hub clutch grooves for causing a hub displacement along the supporting pulley shaft in opposite directions, rim segments slidably mounted on each of the sloping web spoke slides, also arranged to overlap and interweave alternately with each other at their perimeter for engaging and causing displacement of alternate rim segments in opposite directions along their supporting web spoke slides as the hub sections are correspondingly displaced by the attached clutch mechanism for changing the pulley diameter.

4. An adjustable belt pulley adapted for changing the pulley diameter when in motion and used in combination with a pulley shaft, comprising two cylindrical hub sections formed with central bearings suitable for mounting on a pulley shaft and splined thereto, each hub section being formed with a clutch groove at the outer end thereof also with a series of uniformly spaced radially positioned web spokes arranged lengthwise of the cylindrical hub all projected beyond the inner hub end, said web spokes all having their outer edges sloped at a predetermined angle with the hub axis and toward the opposite hub and provided with an edge slide member, the two hubs being positioned on the pulley shaft to alternately overlap and interweave said web spokes together so that alternate web spokes will slope in opposite direction along the shaft, a pulley rim segment formed with a curved V-shaped perimeter slidably mounted on each of the interwoven web spoke slides, placed with their alternate V-shaped perimeter sections interweaving and engaging with each other in a manner for causing a sliding displacement of alternate rim segments in opposite directions along the supporting web spoke slides as the connected hubs are displaced in opposite directions on the supporting pulley shaft, spring means mounted between alternate rim segments for assisting in the rim segment displacement, clutch means suitably mounted for engaging the hub clutch grooves and capable of displacing said hubs simultaneously in opposite directions along the pulley shaft for displacing the connected rim segments and increasing or decreasing the pulley diameter.

In witness whereof I sign the specification.

FREDERICK P. CONNORS.